(12) United States Patent
Geiman et al.

(10) Patent No.: US 8,517,884 B2
(45) Date of Patent: Aug. 27, 2013

(54) POWDER FORGED DIFFERENTIAL GEAR

(75) Inventors: Timothy E. Geiman, South Lyon, MI (US); Alfred J. Chiesa, Farmington Hills, MI (US); Henry J. Knott, Ypsilanti, MI (US); David E. Lenhart, Pomeroy, OH (US)

(73) Assignee: GKN Sinter Metals, LLC, Auburn Hills, MI (US)

( * ) Notice: Subject to any disclaimer, the term of this patent is extended or adjusted under 35 U.S.C. 154(b) by 491 days.

(21) Appl. No.: 12/917,077

(22) Filed: Nov. 1, 2010

(65) Prior Publication Data

US 2011/0059822 A1 Mar. 10, 2011

Related U.S. Application Data

(63) Continuation-in-part of application No. 11/277,388, filed on Mar. 24, 2006, now Pat. No. 7,827,692.

(60) Provisional application No. 61/360,824, filed on Jul. 1, 2010.

(51) Int. Cl.
*F16H 48/06* (2006.01)
(52) U.S. Cl.
USPC .......................................... 475/230; 475/344
(58) Field of Classification Search
USPC .................. 475/230, 236, 336, 344
See application file for complete search history.

(56) References Cited

U.S. PATENT DOCUMENTS

| | | | |
|---|---|---|---|
| 2,065,661 A * | 12/1936 | Davis | 475/236 |
| 3,100,333 A | 8/1963 | Friend | |
| 3,280,624 A | 10/1966 | Weinert | |
| 3,992,763 A | 11/1976 | Haynie et al. | |
| 4,002,471 A | 1/1977 | Sarnes et al. | |
| 4,165,243 A | 8/1979 | Sarnes et al. | |
| 4,244,243 A * | 1/1981 | McCaw | 475/230 |
| 5,984,822 A * | 11/1999 | Schreier et al. | 475/230 |
| 6,352,008 B1 | 3/2002 | Matuoka | |
| 7,117,598 B2 | 10/2006 | Prucher | |
| 7,155,997 B2 * | 1/2007 | Santelli | 74/607 |
| 8,021,260 B2 * | 9/2011 | Homan | 475/235 |
| 2004/0093729 A1 | 5/2004 | Roeske et al. | |
| 2006/0266436 A1 | 11/2006 | Fett | |
| 2007/0221005 A1 | 9/2007 | Geiman | |
| 2007/0221006 A1 | 9/2007 | Geiman | |
| 2007/0224075 A1 | 9/2007 | Geiman | |
| 2007/0287569 A1 | 12/2007 | Miah | |
| 2008/0223163 A1 | 9/2008 | Yamazaki et al. | |

FOREIGN PATENT DOCUMENTS

| | | |
|---|---|---|
| DE | 10 2006 024441 A1 | 11/2006 |
| EP | 0 371 340 A | 6/1990 |
| GB | 2 035 167 A | 6/1980 |
| WO | 0200378 A | 1/2002 |
| WO | 2009025661 A1 | 2/2009 |

OTHER PUBLICATIONS

International Search Report for corresponding PCT patent application No. PCT/US2011/041997, mailed Nov. 11, 2011 [3 pages].
International Search Report of PCT/US2007/076170.
Seki M. et al., "Surface Fatigue Failure and Strength of Case-Hardened Powder-Forged Rollers and Gears," VDI Berichte Duesseldorf, DE, No. 1904, 2005, pp. 1773-1779.

* cited by examiner

*Primary Examiner* — Justin Holmes
*Assistant Examiner* — Huan Le
(74) *Attorney, Agent, or Firm* — Quarles & Brady LLP

(57) ABSTRACT

A differential assembly, bevel gears for the assembly, and a method of making the bevel gears are disclosed. The bevel gears have a form which provides for high power density transfer.

24 Claims, 6 Drawing Sheets

POWDER FORGED DIFFERENTIAL GEAR

CROSS-REFERENCE TO RELATED APPLICATION

This application is a continuation-in-part application of U.S. patent application Ser. No. 11/277,388 entitled "Variable Case Depth Powder Metal Gear and Method Thereof" filed on Mar. 24, 2006 now U.S. Pat. No. 7,827,692 and further claims the benefit of U.S. provisional patent application Ser. No. 61/360,824 entitled "Powder Metal Differential Gear" filed on Jul. 1, 2010. The contents of both of these applications are hereby incorporated by reference as if set forth in their entirety herein.

STATEMENT OF FEDERALLY SPONSORED RESEARCH OR DEVELOPMENT

Not applicable.

BACKGROUND OF THE INVENTION

This disclosure relates to a forged powder metal gear and, more specifically, to a forged powder metal bevel gear for use in differential assemblies.

Conventional automobiles include a differential that transmits the power generated by the engine to the wheels. Although differentials may have varying constructions, the basic principle is to take the power of a single input shaft and transfer it to two output shafts which can then rotate at different speeds. Depending on the type of drive system applied for a given vehicle, there may be a front differential, a rear differential, and/or a central differential. In the case of some differentials for automobiles, this often involves not only splitting the power output, but also dividing the power output preferentially.

There is a continual push to provide differentials with smaller package sizes that are capable of transmitting torque loads comparable to or greater than existing differentials having larger package sizes. Differentials with a smaller package size provide better fuel efficiency and could provide space to potentially accommodate transmissions with more speeds or features.

Hence, there is a need for differentials with smaller package sizes and, accordingly, for smaller components that would permit higher power density transfer of torque loads through such a differential assembly.

SUMMARY OF THE INVENTION

Powder metal bevel gears and differential assemblies including these gears are disclosed which are capable of high density power transfer. The powder metal bevel gears in the differential assembly are able to transmit power loads through a small package size, allowing the footprint of the overall differential assembly to be reduced. This reduces the weight of the vehicle having the differential assembly, improves its fuel efficiency, and provides additional space for the expansion of other components of the vehicle such as, for example, the transmission.

A differential assembly is disclosed for transmitting power in a drive train of a vehicle. The differential assembly includes a carrier rotatable about an output axis extending through the carrier and has a space therein of a sphere diameter. A set of intermeshing gears is carried by the carrier including two spaced apart and co-axial side gears each separately meshing with two spaced apart and co-axial pinion gears. One side gear meshes with both pinion gears on one side of the pinion gears and the other side gear meshes with both pinion gears on the opposite side of the pinion gears. The two side gears are journaled to be rotatable about the output axis and the two pinion gears are journaled to be rotatable about an axis that is perpendicular to the output axis. Further, the two pinion gears are able to orbit about the output axis. Having this structural arrangement provides for a differential transfer of power from a power input to the carrier transferred through the pinion gears to the side gears.

In this differential assembly, at least one of the gears of the set of intermeshing gears is a powder metal bevel gear. This powder metal bevel gear includes a body having an axis of rotation, an axially-extending hole formed in the body, and a plurality of teeth formed in the body. The plurality of teeth include portions inclined with respect to the axis of rotation. The teeth of the pinion gears reside fully within the space defined by the sphere diameter.

The differential assembly is capable of transmitting a power input through the carrier of at least X N·m and the sphere diameter is Y mm or less where X and Y are related to one another by the equation $Y=0.0068 \cdot X+60$ for a duration of one hour in an oil bath during accelerated simulated durability testing. In some forms of the differential assembly, X may be in a range of 1,000 N·m and 12,000 N·m and Y may be in a range of 60 mm and 140 mm. Further, the pinion gears and the side gears may have tooth profiles that maintain a ratio of bending stress to contact stress in the plurality of teeth between 0.55 and 0.85.

The powder metal bevel gear may be powder forged. The powder metal bevel gear may be ferrous and may include a carburized surface layer on the plurality of teeth. This carburized surface layer may have a variable depth around a periphery of the teeth and may be variably shaped during forging.

An outer periphery of the body of the powder metal bevel gear may have scallops formed thereon. An angular position of scallops formed on the powder metal bevel gear may correspond to an angular position of the scallops formed on a preform compact forged to form the bevel gear, thereby angularly aligning the preform compact with respect to a forging tool during forging.

The axially-extending hole of the powder metal bevel gear may include a plurality of axially extending splines and a retention groove may be forged in the hole.

The powder metal bevel gear may have a core hardness of HRC 20 to HRC 50 and a surface hardness in the plurality of teeth greater than HRC 50.

A powder metal bevel gear and a set of bevel gears for a differential assembly of the type described above are also disclosed. Again, these gear(s) are capable of transmitting high power density loads through the transmission in a reliable manner.

These and still other advantages of the invention will be apparent from the detailed description and drawings. What follows is merely a description of some preferred embodiments of the present invention. To assess the full scope of the invention, the claims should be looked to as these preferred embodiments are not intended to be the only embodiments within the scope of the claims.

DETAILED DESCRIPTION OF THE PREFERRED EMBODIMENTS

Figure 1:
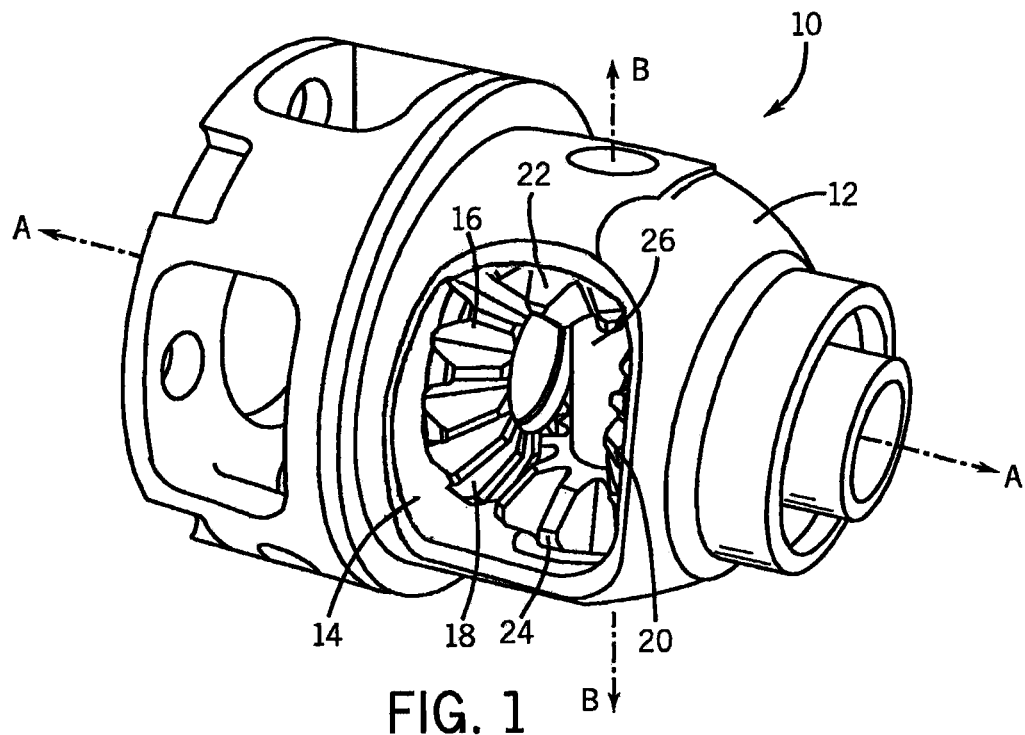
FIG. 1 illustrates a portion of a differential assembly.

Referring to FIG. 1, one type of a differential assembly 10 for a front wheel drive vehicle is shown. The differential assembly 10 is a part of a drive train for the vehicle, although the entire drive train is not shown. The drive train also typically includes an engine which drives a transmission which, in turn, drives the differential assembly 10. When the differential assembly 10 receives the power input from the transmission, the differential assembly 10 transfers this power to two side shafts which extend from the differential assembly 10 along an output axis A-A. The two side shafts transmit the power to the wheels (and their related assemblies) to move the vehicle.

The differential assembly 10 not only transfers the power to the two side shafts, but also is able to distribute the power input to the two side shafts in an uneven matter when the situation dictates. For example, when the vehicle is turning, a wheel at the outside of the turn is travelling faster than a wheel at the inside of the turn. Given the different travel distances of the wheels, one of the side shafts will need to rotate faster than the other. Likewise, in some cases, one or more of the wheels may slip because the wheel(s) are removed from contact with the ground or lose traction on ice or wet pavement. In these situations, the differential may be designed to preferentially distribute torque to the wheels that have traction.

Looking first at the construction of the differential assembly 10, the differential assembly 10 includes a carrier 12 that is rotatable about the output axis A-A which extends through the carrier 12. The carrier 12 has an inner chamber 14 which houses a set of intermeshing gears 16 which reside at least partially in an oil bath (not shown). The set of intermeshing gears 16 includes two side gears 18 and 20 and two pinion gears 22 and 24. Both of these pairs of gears are journaled to the carrier 12, albeit in different ways.

The two side gears 18 and 20 are spaced apart and are co-axial with one another along the output axis A-A. Each of these side gears 18 and 20 are coupled to one of the two side shafts such that both side gears 18 and 20, as well as their corresponding side shafts, rotate about the output axis A-A. As both the carrier 12 and the side gears 18 and 20 are rotatable about the output axis A-A, the side gears 18 and 20 are journaled to the carrier 12 in such a manner as to permit different rates of rotation of the carrier 12 and the side gears 18 and 20 relative to one another. To provide journaling of this kind, for example, axial bores may be formed in the carrier 12 that receive washers or bearings. These washers or bearings may be interposed between the carrier 12 and the back side or hub of each of the side gears 18 and 20 to allow for the rotation of the side gears 18 and 20 on the output axis A-A independent of the rotation of the carrier 12 on the output axis A-A.

Turning now to the two pinion gears 22 and 24, the two pinion gears 22 and 24 are spaced apart and coaxial with one another along an axis B-B, which is perpendicular to and intersects the output axis A-A. Along the axis B-B, a shaft 26 extends through the inner chamber 14 of the carrier 12 and is fixed relative to the carrier 12. This shaft 26 supports the two pinion gears 22 and 24. To accommodate their movement, the two pinion gears 22 and 24 may have bearings, bushings, or coatings located between the two pinion gears 22 and 24 the shaft 26 and/or the inside wall of the inner chamber 14 of the carrier 12. Accordingly, the two pinion gears 22 and 24 are independently rotatable about the axis B-B defined by the shaft 26 and, moreover, can orbit about the output axis A-A with the carrier 12 when the carrier 12 rotates on the output axis A-A.

Figure 2:
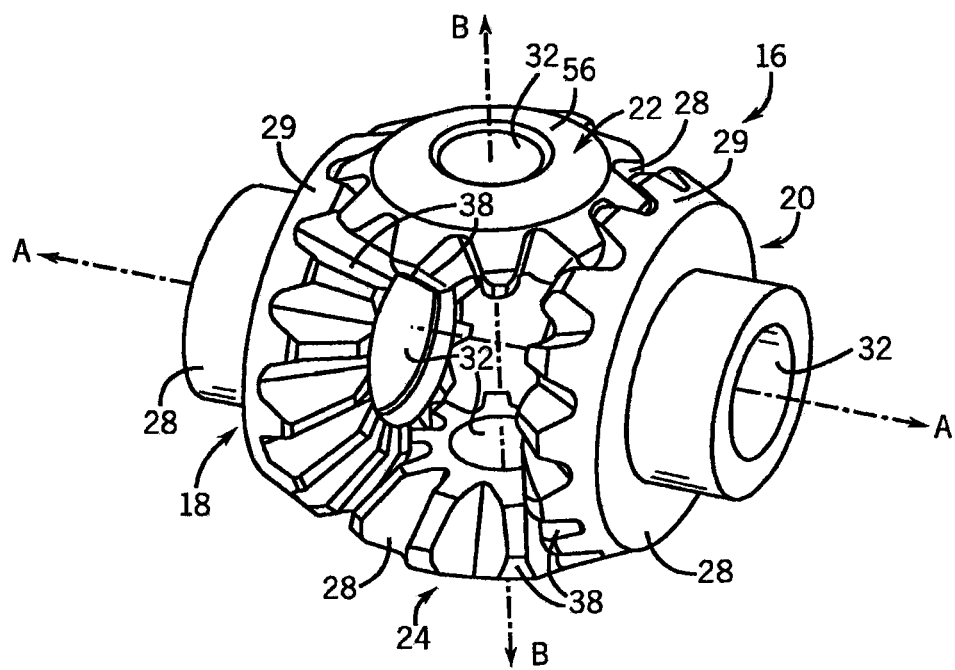
FIG. 2 is a detailed view of an intermeshing of set of gears apart from a differential assembly.

As best seen in FIG. 2, the two side gears 18 and 20 separately mesh with both of the two pinion gears 22 and 24 in the differential assembly 10. On one side of the pinion gears 22 and 24, the side gear 18 separately meshes with the two pinion gears 22 and 24. On the opposite side of the pinion gears 22 and 24, the side gear 20 also separately meshes with the two pinion gears 22 and 24. Given the construction of the differential assembly 10, this meshing of the two side gears 18 and 20 and the two pinion gears 22 and 24 allows for distributive power transfer from the carrier 12 to the two side shafts attached to the two side gears 18 and 20.

In general operation, when the carrier 12 is rotated as a result of receiving a power input from the transmission, the two pinion gears 22 and 24 move with the carrier 12, orbiting around the output axis A-A. The two pinion gears 22 and 24 mesh with the two side gears 18 and 20 to drive them and their attached side shafts as the carrier 12 rotates. Depending on the particular traction conditions, as well as the construction of the rest of the differential assembly 10, the two pinion gears 22 and 24 may differentially drive the two side gears 18 and 20 such that power is distributed preferentially to the side shafts. When both side shafts are being driven equally, the pinion gears 22 and 24 will orbit the output axis A-A, but not rotate on the axis B-B. When the side shafts are driven at differential rates, then the pinion gears 22 and 24 will both orbit about the output axis A-A as well as rotate on axis B-B (which will be rotating with the carrier 12), to provide for the differential driving of the two side shafts.

Of note, the set of intermeshing gears 16 establish a sphere diameter. As used herein, the sphere diameter refers to a sphere with a diameter in which all of the teeth of the pair of pinion gears 22 and 24 reside. In the form shown in FIG. 2, the sphere diameter also corresponds to the convex spherical surface 56 on the back side of the pinion gears 22 and 24, which is the same as the concave spherical surface on the carrier 12 that mates with that convex surface 56.

It should be appreciated that while, in the form shown, some of the walls defining the inner chamber 14 correspond to the sphere diameter, that the inner chamber 14 does not need to be fully spherical, but may involve other dimensions needed to accommodate the gears and associated features of the assembly. As the carrier 12 only rotates about output axis A-A, the inner chamber 14 may be truncated in the area outwardly lateral of the side gears 18 and 20 to reduce the overall package size of the differential assembly 10. A truncation of this kind could be made without compromising functionality of the differential assembly 10.

In any event, when the gear size is reduced, it will decrease the sphere diameter. When the sphere diameter is reduced, the overall size of the carrier 12 and the differential assembly 10 can accordingly be smaller. This is generally viewed as being advantageous, as a smaller differential assembly reduces the overall weight of the vehicle and further reduces the volume in the vehicle occupied by the differential assembly. This gained volume could either be used to reduce the overall size of the drive train or to allow for an increase in size of the other drive train components (e.g., the transmission).

However, as the size of the gears and the differential assembly decrease, in order to transfer an equal amount of power through the differential assembly, the differential assembly must be capable of supporting higher power density transfers. Among other things, this means that the gears must be capable of high power density transmission and not fail under these concentrated loads. Improved gears which are capable of transmitting high power density loads as well as a method of making the gears of this kind are disclosed below.

Now with additional reference to FIGS. 2 through 5, some of the intermeshing gears are shown separate from the differential assembly 10 to better illustrate the structure and form of the gears. All of gears shown in FIGS. 2 through 5 can be formed from powder metal using a process that will be described in more detail below with respect to FIGS. 6 though 9.

Although there are some differences between these gears, they have many similar features. Each of the gears have a body 28 having an axis of rotation. The body 28 is formed by forging a ferrous powder metal material preform which, in many cases, may have already been carburized. Because the powder metal material is forged, it will approach full density.

Figure 3:
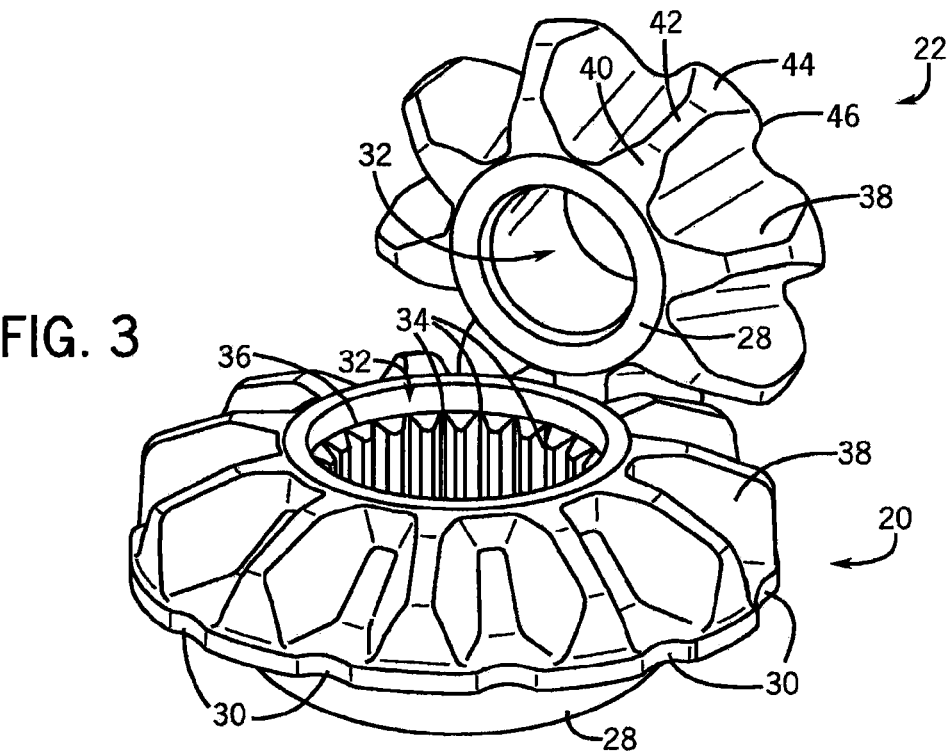
FIG. 3 is a detailed view of a pinion gear and a side gear intermeshing.
Figure 4:
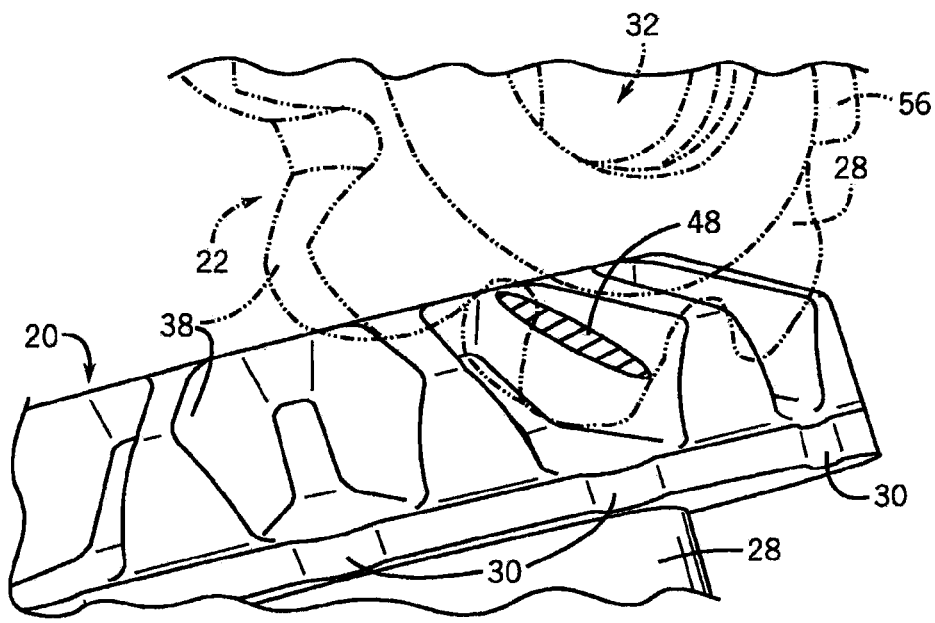
FIG. 4 is a detailed view illustrating a contact area of the gears in FIG. 3.

The outer periphery of the body 28 of some of the gears, such as the side gear 20 in FIGS. 3 and 4, which are unfinished, have scallops 30 formed thereon. The other gears (such as side gear 18 shown in FIG. 2, and the pinion gears 22 and 24) at one point may have had scallops formed on them; however, these scallops have been machined off after forging leaving a surface 29 which may be frusto-spherical or frusto-conical. As will be described in more detail below with respect to the method, these scallops 30 play an important role in orienting the preform of the gear in the forge tooling.

An axially-extending hole 32 is formed in the body 28. As mentioned above, the axially-extending hole 32 may be used to attach the gears to a corresponding shaft (either the shaft 26 as in the case of the two pinion gears 22 and 24 or a side shaft as in the case of the two side gears 18 and 20).

Figure 5:
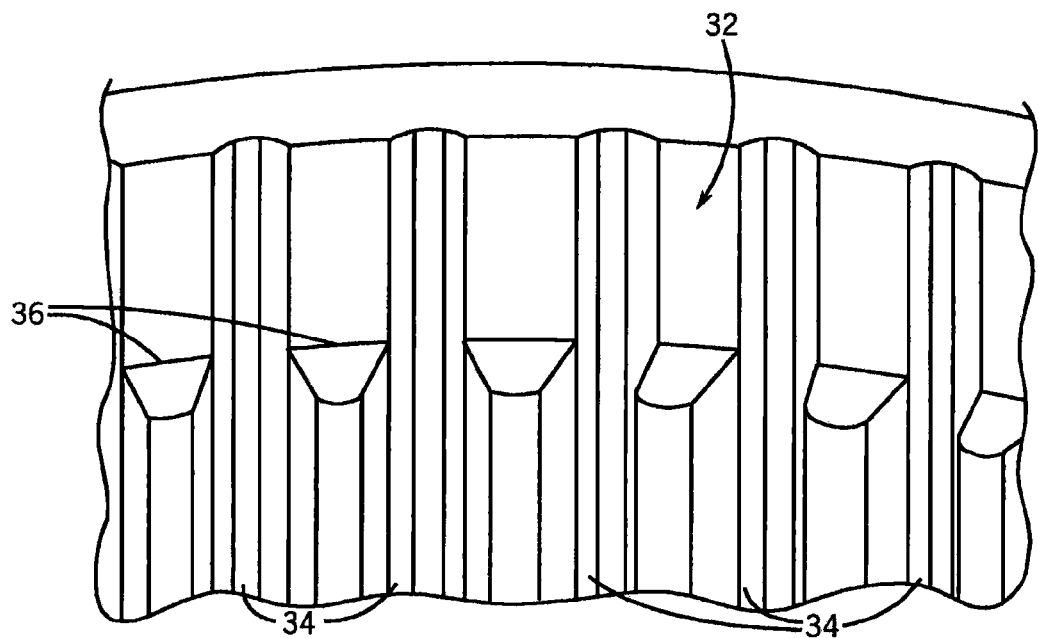
FIG. 5 is a detailed view of an axially-extending through hole of the side gear in which axially-extending splines and a retention groove have been formed in the side gear.

In the form shown, however, and as best depicted in FIGS. 3 and 5, the side gear 20 has a hole 32 that has various features formed therein. With particular reference to FIGS. 3 and 5, the hole 32 on the side gear 20 is formed with a plurality of axially-extending splines 34 and a circumferential retention groove 36. Given the fine nature of these features, they may be forged into the hole 32 during the forging process. The axially-extending splines 34 on the side gears 18 and 20 may be used to mate with splines on the side shafts to lock the rotation of the side gears 18 and 20 to the corresponding half shafts. The retention groove 36 may be used to prevent the axial movement of the side shafts relative to the side gears 18 and 20 and, moreover, to reduce the number of components and the complexity of assembling the side shafts to the side gears 18 and 20.

A plurality of teeth 38 are formed in the body 28. As indicated by the reference numerals in FIG. 3, the plurality of teeth 38 include toe portions 40 which are generally perpendicular to the axis or rotation and found near a front half of the gears, inclined portions 42 inclined with respect to the axis of rotation of the gears, and heel portions 44 which are found at an outer periphery 46 of the gears. Because the plurality of teeth 38 are formed in this way, the gears are by definition bevel gears, meaning that the teeth of the gears can mesh at an angle with one another. Accordingly, as depicted in FIGS. 1 through 4, the teeth of the side gears 18 and 20 mesh with the teeth of the pinion gears 22 and 24, even though the rotational axis of the side gears 18 and 20 are perpendicular to the rotation axis of the pinion gears 22 and 24.

Notably, because of the manner in which the gears are formed, which will be described in more detail below, the teeth can be forged such that more of the flank of the teeth 38 is available during meshing or contact between the side gears 18 and 20 and the pinion gears 22 and 24.

Among other things, gears forged by the method described below can also have tooth tip corner radii of less than 0.8 mm, which allows for a higher contact ratio between the meshing teeth. It should also be appreciated that the typical lower limit for conventional forging for tip corner radii is currently 0.8 mm. Forged powder metal bevel gears made using the methods described below can have tip corner radii less than the current typical lower limit and go as low as 0.2 mm because of the preform forming and forging technologies employed.

As best seen in FIG. 4, a contact area 48 between meshing teeth extends from an area near to the top of the toe portion 40 to an area near to the heel portion 44 at a certain angle of rotation. The contact area will translate along the flank of the teeth 38 during rotation of the gear set. Preferably, the contact area 48 distributes the load uniformly between the toe 40 and heel 44 portions of the flank of the teeth 38 during operating conditions. In conjunction with the optimized contact area 48, the increased contact ratio resulting from the lower tooth tip corner radii results in improved load sharing and load transfer between the meshed gears during operation of the differential.

By reducing the tooth tip corner radii and optimizing the contact area pattern in conjunction with the benefits of the variable case depth (to be explained below), the design of the gear set can be adapted to allow for greater gear contact stress thereby reducing the bending stress to the contact stress ratio, which results in an overall improvement in differential performance. By these improvements to gear tooth form, the contact stress to bending stress ratio can be brought into the range of 0.55 to 0.85. For gears made by conventional methods, this ratio is typically closer to 1.0. Accordingly, the lower contact stress to bending stress ratio results in lower peak bending stresses resulting in fewer tooth fractures.

Although it cannot be seen in FIGS. 2 through 5, the plurality of teeth 38 also have a carburized surface layer. As will be described in further detail below, this carburized surface layer is formed by variably forging or shaping a carburized layer of initially uniform thickness during formation of the bevel gear so that the teeth have a profile similar to the profile shown in FIG. 9.

As the surface of the teeth is carburized, the teeth may have a surface hardness of HRC 50 to HRC 60 or greater, while the core hardness of the bevel gear is in a range of approximately HRC 20 to HRC 50.

Other features may also be formed in the gears, depending on the particular type of gear as well as the construction of the particular differential assembly. For example, although not shown, clutch teeth may be formed on the side gears for use in a differential locking system. As another example of a feature that may be found on some of the gears, the pinion gears 22 and 24 include a semi-spherical rear surface 56 that bears on the walls of the inner chamber 14. Of course, these and other features may be tied to other design considerations for the differential and should not be considered in any way limiting.

Figure 6:
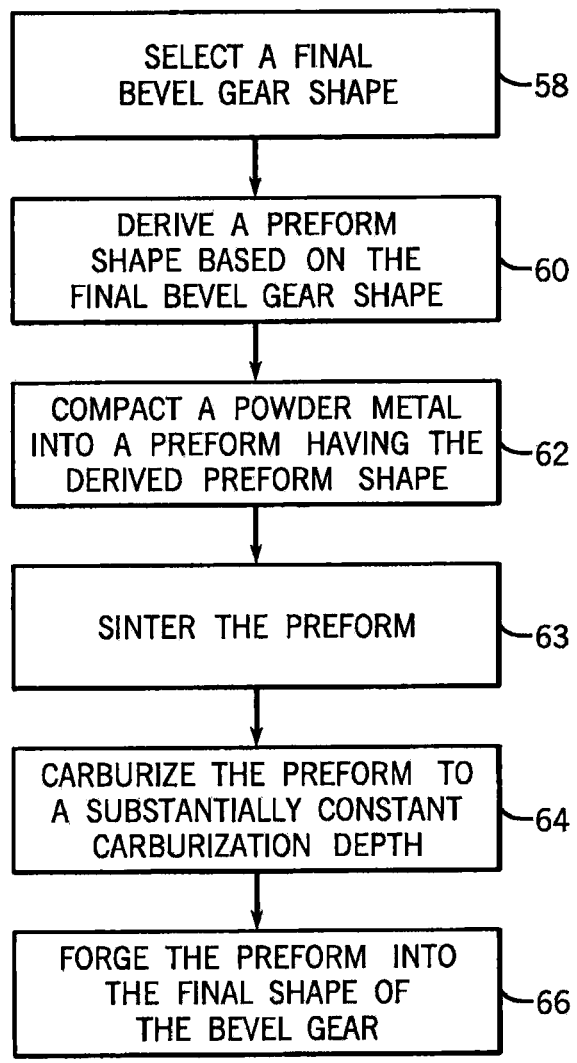
FIG. 6 outlines a method of forming a powder forged bevel gear.

Turning now to FIG. 6, a method of making bevel gears of this type is illustrated. A final bevel gear shape is first selected or established, including a final carburized profile in the plurality of teeth of the bevel gear, according to step 58. With this final form in mind, a preform shape based on the final bevel gear shape is derived according to step 60. A powder metal material is compacted according to step 62 and sintered according to step 63 into the preform shape. The preform is carburized, either simultaneously with sintering (not illustrated, but would be a combination of steps 63 and 64) or subsequent to sintering according to step 64, to a substantially constant or uniform carburization depth. Preferably, the sintering and carburizing steps occur simultaneously to eliminate additional process steps and to reduce cost. The sintered and carburized preform is then placed in a forge to forge the preform shape into the final shape of the bevel gear according to step 66. Although it is not indicated in FIG. 6, the process may further include post-forging machining to, for example, remove a scalloped periphery from the gear or to refine or size other features.

Figure 7:
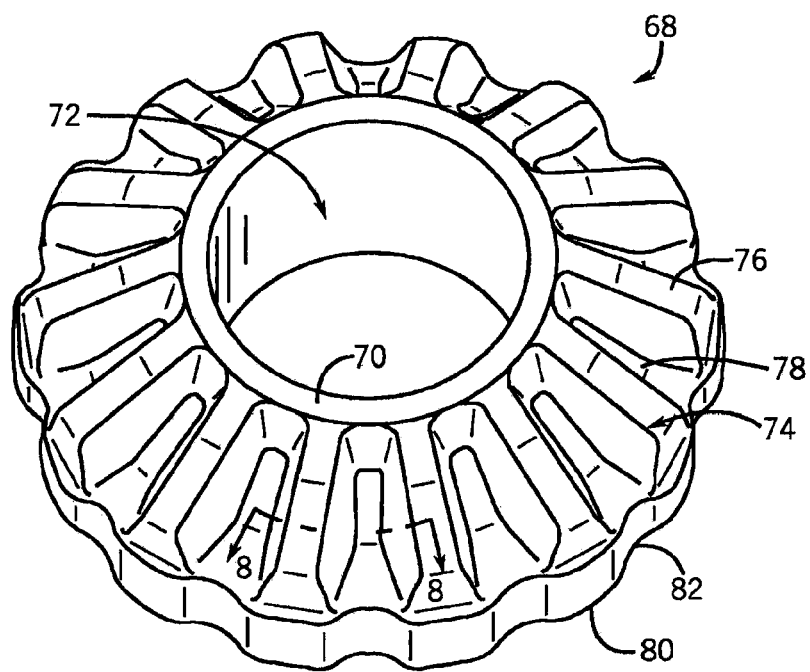
FIG. 7 is a powder metal preform designed to be forged into a bevel gear.
Figure 8:
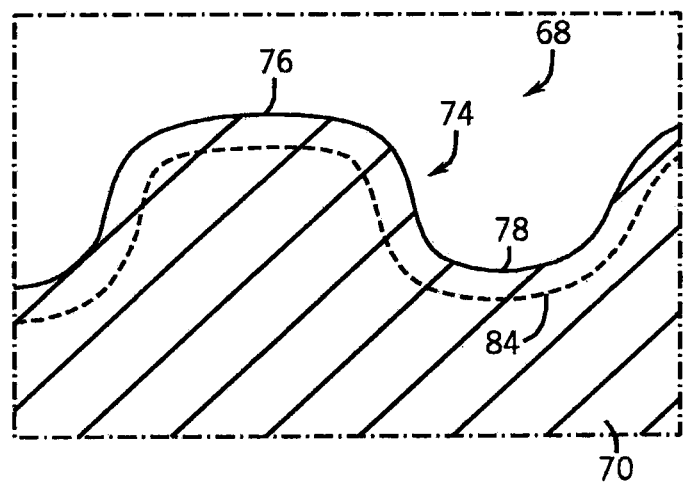
FIG. 8 is an example of a cross-sectional view taken through a powder metal preform in an pre-forged tooth area that will be forged to form the teeth of the final bevel gear in which a uniform carburized layer has been formed along a surface.
Figure 9:
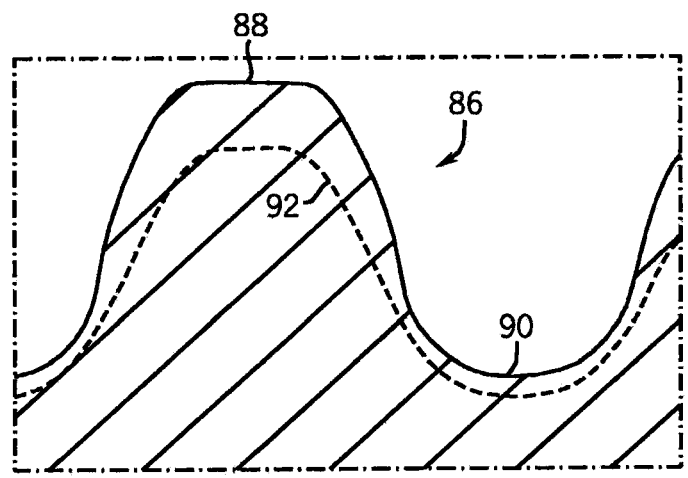
FIG. 9 is a cross-sectional view of a differential gear forged from a preform having a carburized profile as in FIG. 8, in which the carburized layer has been variably shaped by the forging.

With additional reference to FIGS. 7 through 9, a specific implementation of this method is shown for purposes of illustration. This implementation is now described with additional detail to explain the particular manner in which the steps of the method may be carried out, as well as to highlight the various advantageous of the method.

According to step 58, the final bevel gear shape must be first established. This step can include not only determining the final shape of the bevel gear, but also determining the profile of the carburized layer on the surface of the gear. FIG. 9 illustrates one particularly beneficial profile in which the carburization is thickest at the tips of the teeth, of a reduced thickness at the roots of the teeth, and an intermediate thickness between the tip and the root, e.g., at the pitch diameter. Given the particular geometry of the bevel gear, it will be readily appreciated that the cross-sectional carburization profile of the teeth may vary depending on the distance from the axis of rotation. This beneficial variable carburized profile allows the gears to withstand higher contact stresses at the pitch diameter where the carburization is thicker, while avoiding brittleness at the root where the bending stresses are typically higher. Conversely, this benefit cannot be practically achieved with conventionally forged and carburized gears where the carburization depth will be similar at the pitch line and root diameter due to the limits of the diffusive process.

With this final bevel gear shape in mind as well as the carburization profile, a preform shape is then derived according to step 60. With an appreciation of the final target shape of the bevel gear, the carburization profile in the teeth of the final bevel gear, and the fact that the preform will carburized to a substantially uniform or constant depth prior to forging, a preform shape can be derived that will result in the desired final part shape after forging. This derivation will ideally be done using modeling software, or could be done using extensive manual calculations. Once this preform shape is derived, a tool set is formed that allows for a preform having this shape (or that, more accurately, would result in a powder compact that would have the targeted preform shape after sintering).

For purposes of illustration, a preform 68 for a bevel gear is shown in FIG. 7 and a cross-section through a section of the preform 68 is shown in FIG. 8. The preform 68 includes a body 70 with an axially-extending hole 72. A plurality of preformed teeth 74 are formed at an inclined angle with respect to the axis of the preform 68. The plurality of preformed teeth 74 have preformed tips 76 and preformed roots 78. It should be observed that the profile of the plurality of preformed teeth 74 is not the same as the final tooth profile of the forged gear. Moreover, it should be observed in FIG. 7 that an outer periphery 80 of the preform 68 has scallops 82 formed thereon, which correlate to the angular positioning of the plurality of preformed teeth 74.

Once the preform 68 is compacted, it is sintered and carburized either sequentially, as shown in FIG. 6, or simultaneously by combining steps 63 and 64. The carburization depth line is illustrated on FIG. 8 as reference numeral 84. It should be noted that as carburization is a diffusive process, the carburization depth is not discrete as shown. Rather, this line is intended to illustrate an effective carburization depth.

After sintering and carburizing the preform 68, the preform 68 is forged according to step 66. When the preform 68 is inserted into the forge, the scallops 82 on the outer periphery 80 of the preform 68 align the preform 68 in the forging tool (most likely, in the die of the forge). The placement of the scallops 82 aligns the preform 68 within the forge tooling so that the forge tooling can shape the preformed teeth 74 in the desired manner. The contacting surface of the forge tooling will have a profile that is the inverse of the final tooth shape that is shown in FIG. 9 and the scallops 82 assist in ensuring the preformed teeth 74 properly angularly align with the forging tooling contacting surfaces.

During forging, the preform 68 is forged into the final bevel gear shape, the teeth of which are shown in cross section in FIG. 9. As can be seen in a comparison of the cross sections of FIGS. 8 and 9, during forging, a plurality of teeth 86 are fully developed having tips 88 and roots 90 with a final carburization profile 92 of variable thickness. The thickness of the variable carburization profile at the various points depends on the particular manner in which the uniform carburized layer is variably shaped during forging.

It should be appreciated that forming a bevel gear with the performance described herein was not readily possible using existing powder metal methods. Notably, if a sintered preform contained a uniform carbon content needed to achieve the surface hardness requirement, then this preform would then be too difficult to forge into this type of complex geometry due to excessive tooling stresses. Without a preform 68 with a plurality of preformed teeth 74, the sintered preform blank would have a frusto-conical surface into which the teeth would need to be forged. Inducing the flow of a carburized layer to form teeth would require a significant displacement or movement of the carburized material from the initial frusto-conical surface that would impart great stress to the tools of the forge and often result in the failure of tools. This would also place severe limitations on the form of the carburization layer. Likewise, if a non-carburized part was forged and then carburized, traditional gas carburization could not be used to form the disclosed variable profile because of the limits of the pure diffusive carburization process.

By creating a preform 68 with a plurality of preformed teeth 74 and aligning the preformed teeth 74 relative to the inverse tooth profile on the forge tooling before forging, the final tooth profile can be formed without moving the material of the carburized layer as far as if the pre-forged tooth surface was frusto-conical. Because the carburized material does not need to be moved as far, finer features can be formed including the above-mentioned decreased tooth tip corner radii which provides for improved gear forms which allow for improved performance.

Moreover, because the final part dimensions are established at the forging step, pre-forging carburization can occur at a higher temperature than if carburization was performed post-forging. If a forged part was subsequently carburized, then the temperature at which carburization occurs would need to be kept relatively low to avoid distortion of the final part dimensions or sagging of portions of the part. Because gas carburization is a diffusive process and is highly temperature dependent, carburization at lower temperatures will take greater lengths of time to complete.

In contrast, the described process permits pre-forging carburization of the preform, at which point maintaining dimensional accuracy in the preform is less crucial. Carburization can be performed at higher temperatures and carburization to a pre-determined depth can be achieved more quickly. Additionally, when the part is simultaneously sintered and carburized, the initial porosity of the part may further improve the speed of and depth of penetration during the carburization process. As the final part dimensions of the gear made by the described process are determined during forging, the final powder metal bevel gear will still have superb dimensional accuracy.

Accordingly, a bevel gear can be formed from a carburized preform that has a very precisely controlled carburization profile and final gear form. Traditionally, because carburization could only be performed after forging, there were limitations on the shape of the final profile of the carburized layer.

The gears made using this method have been tested in differential assemblies similar to the differential assembly 10 with heretofore unseen performance. Looking now at FIG. 10, gears formed by the method above were placed in a differential assembly and subjected to an accelerated durability test of the differential assembly that simulated operating conditions. This test is performed in a multi-axis machine that delivers a torque input to the differential and controls the speed difference (typically in the range of 5 to 20 revolutions per minute) and torque difference (typically in the range of 20 to 50%) between the two side shafts. The accelerated durability test can be performed with the differential case being locked in place and at low speeds (i.e., at speeds less than full speed, but at speeds sufficient to establish the desired speed differential between the two side shafts). Actual lubrication conditions are also simulated by operating the test in a bath of the appropriate oil under appropriate conditions. In this way, the most stressful potential operating conditions can be simulated to provide the differential with maximum stress conditions caused by constantly differentiating the differential to simulate, e.g., aggressively driving a vehicle in a tight circle in resistive mud.

Figure 10:
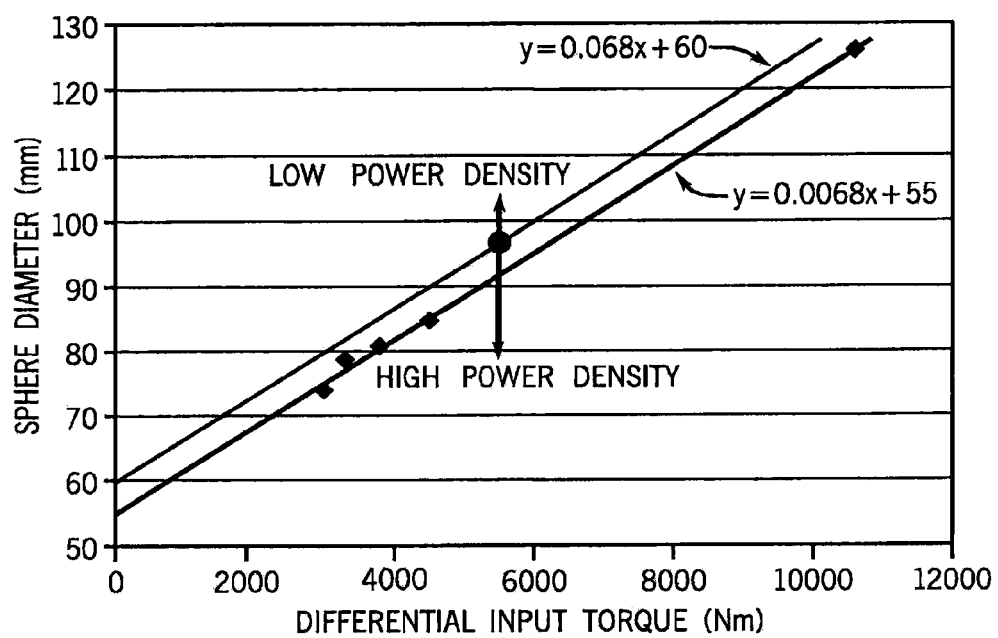
FIG. 10 is a graph illustrating the relationship between the sphere diameter and the differential power input for a differential assembly including powder metal bevel gears.

To create the graph of FIG. 10, various size differential assemblies were evaluated having different sphere diameters and different application requirements. As mentioned above, the sphere diameter is the sphere into which all of the teeth of the pinion gears reside. The differential assemblies were evaluated to determine the amount of differential input torque that the assemblies having various sphere diameters could reliably transfer. To be able to reliably operate at these conditions, the gears of the differential assembly needed to be able to perform for at least one hour under the most extreme simulated durability testing conditions described above. It should be appreciated that in actual use, the most extreme conditions may happen only periodically and momentarily. Thus, an accelerated test of this type is intended to rate the performance of the differential, but is not typical of actual use.

The parameters from the evaluation of various size differentials are found in Table I below.

TABLE I

| Sphere Diameter (mm) | Differential Input Torque (N·m) |
|---|---|
| 74 | 3,000 |
| 79 | 3,500 |
| 81 | 3,800 |
| 85 | 4,500 |
| 126 | 10,600 |

This data is plotted onto the graph of FIG. 10 and a best fit line Y=0.0068·X+55 has been calculated from these five data points to find a relationship between sphere diameter and differential input torque. As indicated in FIG. 10, a second offset line Y=0.0068·X+60 establishes a line of reliable operation (i.e., a line that depicts operation within approximately 10% of the best fit line) for a sphere diameter of Y mm for a differential input torque of X N·m. Any values to the left of this line are defined as low power density transfers and values to the right of this line are defined as high power density transfers.

Thus, bevel gears have been disclosed for a differential assembly that provide for high power density transfers. These bevel gears are made using methods which increase the overall performance of the gears and allow their size to be decreased. Accordingly, the size of the gears can be decreased without necessarily reducing the ability of the gears to transmit power through the differential. Accordingly, the sphere diameter of the gears and the overall size of the differential assembly can be reduced to create a differential assembly having a smaller package size without compromising the performance of the vehicle.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A differential assembly for transmitting power in a drive train of a vehicle, comprising:
   a carrier rotatable about an output axis extending through the carrier, the carrier having a space therein of a sphere diameter;
   a set of intermeshing gears carried by the carrier including two spaced apart and co-axial side gears each separately meshing with two spaced apart and co-axial pinion gears, one side gear meshing with both pinion gears on one side of the pinion gears and the other side gear meshing with both pinion gears on the opposite side of the pinion gears, in which the two side gears are journaled to be rotatable about the output axis and the two pinion gears are journaled to be rotatable about an axis that is perpendicular to the output axis and to be able to orbit about the output axis, thereby providing a differential transfer of power from a power input to the carrier transferred through the pinion gears to the side gears, at least one of the gears of the set of intermeshing gears being a powder metal bevel gear including:
   a body having an axis of rotation;
   an axially-extending hole formed in the body; and
   a plurality of teeth formed in the body, the plurality of teeth including portions inclined with respect to the axis of rotation;
   wherein the teeth of the pinion gears reside fully within the space defined by the sphere diameter; and wherein the differential assembly is capable of transmitting a power input through the carrier of at least X N·m and the sphere diameter is Y mm or less where X and Y are related to one another by the equation Y=0.0068·X+60 for a duration of one hour in an oil bath during accelerated simulated durability testing.

2. The differential assembly of claim 1 wherein X is in a range of 1,000 N·m and 12,000 N·m and Y is in a range of 60 mm and 140 mm.

3. The differential assembly of claim 1 wherein the pinion gears and the side gears have tooth profiles that maintain a ratio of bending stress to contact stress in their plurality of teeth between 0.55 and 0.85.

4. The differential assembly of claim 1 wherein the powder metal bevel gear has a core hardness of HRC 20 to HRC 50 and a surface hardness in the plurality of teeth greater than HRC 50.

5. The differential assembly of claim 1 wherein the powder metal bevel gear has a tooth tip corner radii less than 0.8 mm.

6. The differential assembly of claim 1 wherein the axially-extending hole includes a plurality of axially extending splines forged therein.

7. The differential assembly of claim 6 wherein the axially-extending hole further includes a retention groove forged therein.

8. The differential assembly of claim 1 wherein an outer periphery of the body of the powder metal bevel gear has scallops formed thereon.

9. The differential assembly of claim 8 wherein an angular position of scallops formed on the powder metal bevel gear corresponds to an angular position of the scallops formed on a preform compact forged to form the bevel gear, thereby angularly aligning the preform compact with respect to a forging tool during forging.

10. The differential assembly of claim 1 wherein the powder metal bevel gear is a powder forged gear.

11. The differential assembly of claim 10 wherein the powder metal bevel gear is ferrous and includes a carburized surface layer on the plurality of teeth.

12. The differential assembly of claim 11 wherein the carburized surface layer has a variable depth around a periphery of the teeth.

13. The differential assembly of claim 12 wherein the carburized surface layer is variably shaped during forging.

14. A powder metal bevel gear for a differential assembly including a carrier rotatable about an output axis extending through the carrier, the carrier having a space therein of a sphere diameter, the powder metal bevel gear being at least one of the gears of a set of intermeshing gears carried by the carrier, the set of gears including two spaced apart and co-axial side gears each separately meshing with two spaced apart and co-axial pinion gears, one side gear meshing with both pinion gears on one side of the pinion gears and the other side gear meshing with both pinion gears on the opposite side of the pinion gears, in which the two side gears are configured to be journaled to be rotatable about the output axis and the two pinion gears are configured to be journaled to be rotatable about an axis that is perpendicular to the output axis and to be able to orbit about the output axis, thereby providing a differential transfer of power from a power input through the carrier transferred through the pinion gears to the side gears, the powder metal bevel gear comprising:
a body having an axis of rotation;
an axially-extending hole formed in the body; and
a plurality of teeth formed in the body, the plurality of teeth including portions inclined with respect to the axis of rotation;
wherein the teeth of the pinion gears reside fully within the space defined by the sphere diameter; and
wherein the set of meshing gears is capable of transmitting a power input through the carrier of at least X N·m and the sphere diameter is Y mm or less where X and Y are related to one another by the equation Y=0.0068·X+60 for a duration of one hour in an oil bath during accelerated simulated durability testing.

15. The powder metal bevel gear of claim 14 wherein X is in a range of 1,000 N·m and 12,000 N·m and Y is in a range of 60 mm and 140 mm.

16. The powder metal bevel gear of claim 14 wherein an outer periphery of the body of the powder metal bevel gear has scallops formed thereon and wherein an angular position of scallops formed on the powder metal bevel gear corresponds to an angular position of the scallops formed on a preform compact forged to form the bevel gear, thereby aligning the angular position of the preform compact with respect to a forging tool during forging.

17. The powder metal bevel gear of claim 14 wherein the powder metal bevel gear has a tooth tip corner radii less than 0.8 mm.

18. The powder metal bevel gear of claim 14 wherein the powder metal bevel gear is ferrous and includes a carburized surface layer on the plurality of teeth.

19. The powder metal bevel gear of claim 18 wherein the carburized surface layer has a variable depth around the periphery of the teeth.

20. The powder metal bevel gear of claim 18 wherein the carburized surface layer is variably shaped during forging.

21. A set of bevel gears for a differential assembly, the differential assembly having a carrier rotatable about an output axis that extends through the carrier, the carrier having a space therein of a sphere diameter, the set of bevel gears comprising:
two spaced apart and co-axial side gears and two spaced apart and co-axial pinion gears, one side gear configured to mesh with both pinion gears on one side of the pinion gears and the other side gear configured to mesh with both pinion gears on the opposite side of the pinion gears, the two side gears being configured to be journaled to be rotatable about the output axis and the two pinion gears being configured to be journaled to be rotatable about an axis that is perpendicular to the output axis and to be able to orbit about the output axis, thereby providing a differential transfer of power from a power input through the carrier transferred through the pinion gears to the side gears, at least one of the gears of the set of bevel gears comprising:
a body having an axis of rotation;
an axially-extending hole formed in the body; and
a plurality of teeth formed in the body, the plurality of teeth including portions inclined with respect to the axis of rotation;
wherein the teeth of the pinion gears reside fully within the space defined by the sphere diameter; and
wherein the set of meshing gears is capable of transmitting a power input through the carrier of at least X N·m and the sphere diameter is Y mm or less where X and Y are related to one another by the equation Y=0.0068·X+60 for a duration of one hour in an oil bath during accelerated simulated durability testing.

22. The set of bevel gears of claim 21 wherein X is in a range of 1,000 N·m and 12,000 N·m and Y is in a range of 60 mm and 140 mm.

23. A set of bevel gears of claim 21 wherein the pinion gears and the side gears have tooth profiles that maintain a ratio of bending stress to contract stress in their plurality of teeth between 0.55 and 0.85.

24. The set of bevel gears of claim 21 wherein at least one of the gears has a tooth tip corner radii less than 0.8 mm.

* * * * *